(No Model.)
W. & J. PATERSON.
STEAM PLOW.
No. 308,923. Patented Dec. 9, 1884.
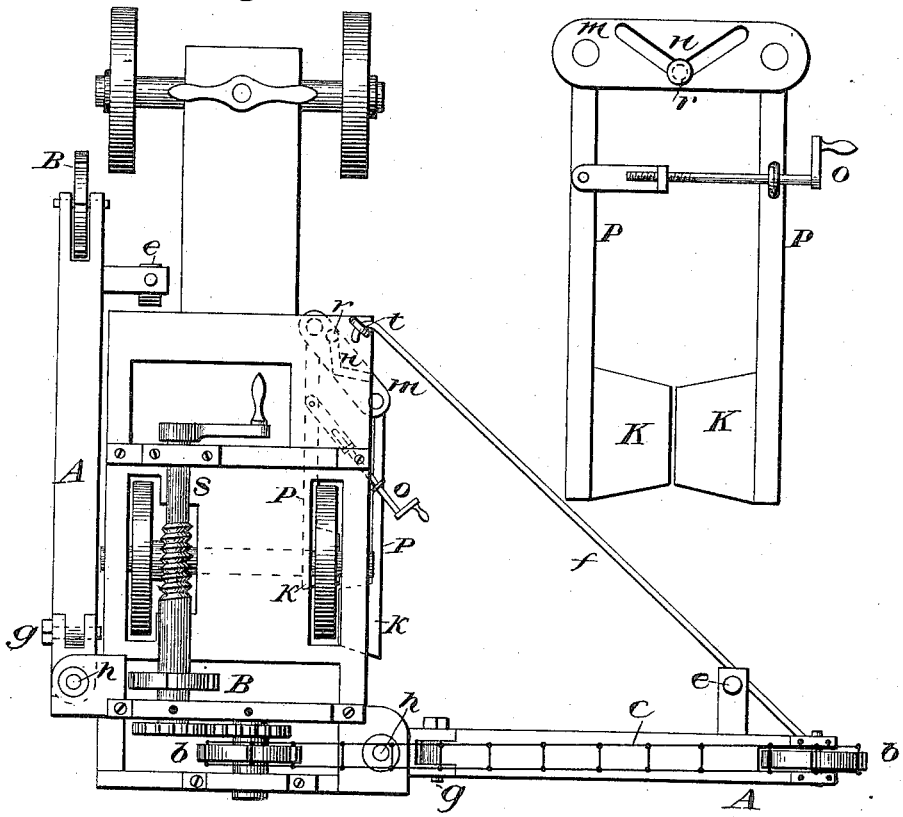
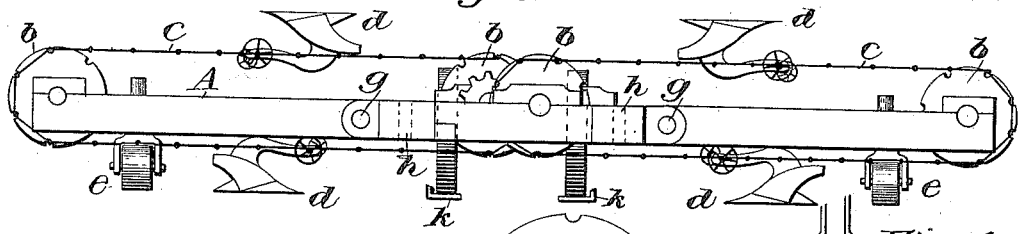
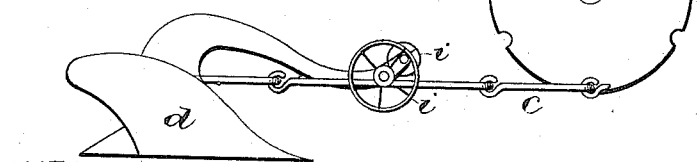
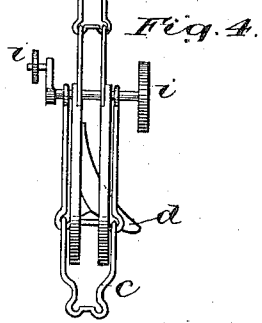
Witnesses:
Elihu B. Stowe
David Young
Inventor.
William Paterson
James Paterson

UNITED STATES PATENT OFFICE.

WILLIAM PATERSON AND JAMES PATERSON, OF EUREKA MILLS, CAL.

STEAM-PLOW.

SPECIFICATION forming part of Letters Patent No. 309,923, dated December 9, 1884.

Application filed July 18, 1883. (No model.)

*To all whom it may concern:*

Be it known that we, WILLIAM PATERSON and JAMES PATERSON, of Eureka Mills, Plumas county, State of California, have invented a new and useful Improvement in Steam-Plows and Traction-Engines, which improvement is fully set forth in the following specification and accompanying drawings.

Figure 1 is a plan view of any ordinary road-engine with our plowing apparatus and automatic rails attached. Fig. 2 is a rear view of the same. Fig. 3 is an enlarged side view of plow and chain wheel. Fig. 4 is a plan view of plow, plow-wheels, and chain attached. Fig. 5 is a plan view of traction-wheel with automatic rails and connections.

The object of our invention is to furnish a plowing apparatus and engine, the latter propelling itself, and at the same time operating the plows, by a movement independent of the vehicular properties of the engine; and it consists of, first, the combination of the plow-frame, the arms loosely connected thereto and provided with braces, the belts to which the plows are connected, and the wheels which operate the belts, and a motive power for operating the plows; second, the combination of the plow-frame, an arm pivoted to each side of the frame, two separate belts provided with plows, a separate driving-wheel for each belt, and a motive power for operating the plows; third, the combination of the plow-frame provided with wheels with the rails, slotted swinging beam, and a means for adjusting the tracks, all of which will be more fully described hereinafter.

The plowing mechanism and apparatus consists of arms A A, hinged to plates $h\ h$ at the rear of the engine-frame and extending transversely in two sections therefrom. At each end of these arms is mounted a sprocket-wheel, $b$, engaging with and carrying a chain, $c$, along the course of each of the arms A. To these endless chains $c$, at even distances, are attached two or more plows, $d$. The arms A are each supported at their outside end by a caster-wheel, $e$. Each arm A is also provided with a brace, $f$, extending diagonally from the outer end of the arm to the forward end of the engine, so as to secure rigidity laterally. These braces are hinged at either end to their respective points of attachment, so as to admit of the arms A and accompanying parts carrying the plows adapting themselves to the undulations of the surface of the lands being plowed. The heads of the jaws of hinges $g$ are attached to the plates $h$ by a pin passing loosely through eyelet-holes in each, which device permits of folding the arms closely to the engine, facilitating the moving of the entire apparatus from place to place. This feature is shown in Fig. 1 of the drawings.

Attached to the beams of the plows $d$ are guide-wheels $i$. The plows being attached to the endless chains $c$, the guide-wheels $i$, when the plows are in the ground, serve to gage the depth of plowing, and when the plows are out of the ground they serve to balance the inverted plows when traveling the length of and above the arms A, as will be hereinafter shown.

K K are the rails of a track, attached by connecting-rods P P to a swinging bar, $m$, at the front of the engine-frame. The two rods P are connected together by the screw-rod O, which is swiveled upon one rod, and which has its screw-threaded end to pass through a suitable nut or casting on the other rod, P. This screw-rod serves to expand the rails K when not in service by forcing the rear ends of the rods P apart, and to guide them when in service. There is a separate track and operating mechanism for each of the forward wheels. The slot in the bar $m$ causes one end of the bar to advance while the other one recedes, and thus the tracks, through the rods P, are caused to work in a zigzag manner. The traction-wheels of the engine and inner sprocket-wheels, $b$, are suitably geared to a crank-shaft, S, to which shaft, when rotary motion is given, the arms A then being in position for plowing transversely to the advance movement of the engine, the engine moves slowly and continuously forward, and at the same time the operation of plowing commences by the chain $c$ rapidly rotating around the chain-wheels $b$, carrying the plows $d$, guided in the ground and supported when inverted by guide-wheels $i$. The length of arms and the number of plows are limited only by the capacity of the engine employed. The traction-wheels of the engine tread upon the rails K, connected, as shown, to the outer ends of swinging bars m by rods P. Each rail, as fast as released from the passage of the wheels, is drawn rapidly in front of the wheel it supplies by the inner end of its swinging bar, and when the wheel treads on both rails the bolt r permits the swinging bar m, having the angular slot n, to slide transversely until the rail behind is released and is drawn in front of the traction-wheel, as before, and so on, supplying a continuous track.

One section of the plowing-arms A may be employed in plowing, if desired, and the other may be dispensed with. In case both arms are used in plowing, left-hand mold-board plows are used on the right arm and right-hand mold-board plows on the left arm.

The plows may be attached singly, as shown, or in gangs.

The plowing-arms may be set at other angles to the engine than at right angles, as shown.

Having thus described our invention, what we claim as new and of our invention is—

1. The combination of the plow-frame, the two arms which project beyond opposite sides thereof, an endless belt having plows attached thereto, and a driving-wheel for each arm, the arms being adapted to be folded against the sides of the frame, and the two sets of plows used either singly or together, substantially as shown.

2. The combination of the plow-frame, the arms A, loosely connected thereto, and provided with the braces f, the wheels b, belts c, and plows connected to the belts, and a motive power for operating the belts and plows at an angle to the plow-frame, substantially as described.

3. The combination of the plow-frame provided with wheels with the rails K, connected to a swinging slotted beam, and means for adjusting the tracks laterally, substantially as shown.

WILLIAM PATERSON.
JAMES PATERSON.

Witnesses:
 CAESAR ROSSETTI,
 GEO. E. COOK.